US012580642B2

(12) United States Patent
Sharma et al.

(10) Patent No.: US 12,580,642 B2
(45) Date of Patent: Mar. 17, 2026

(54) METHODS, COMMUNICTIONS DEVICES, AND NON-TERRESTRIAL INFRASTRUCTURE EQUIPMENT

(71) Applicant: Sony Group Corporation, Tokyo (JP)

(72) Inventors: Vivek Sharma, Basingstoke (GB); Samuel Asangbeng Atungsiri, Basingstoke (GB); Hideji Wakabayashi, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 517 days.

(21) Appl. No.: 18/015,333

(22) PCT Filed: Jul. 29, 2021

(86) PCT No.: PCT/EP2021/071352
§ 371 (c)(1),
(2) Date: Jan. 10, 2023

(87) PCT Pub. No.: WO2022/023507
PCT Pub. Date: Feb. 3, 2022

(65) Prior Publication Data
US 2023/0268990 A1    Aug. 24, 2023

(30) Foreign Application Priority Data

Jul. 31, 2020    (EP) ..................................... 20189031

(51) Int. Cl.
*H04B 7/185*    (2006.01)
(52) U.S. Cl.
CPC ....... *H04B 7/18532* (2013.01); *H04B 7/1851* (2013.01)
(58) Field of Classification Search
CPC ........................... H04B 7/18532; H04B 7/1851
(Continued)

(56) References Cited

U.S. PATENT DOCUMENTS 7,593,726 B2    9/2009    Karabinis et al.
8,095,145 B2    1/2012    Singh et al.
(Continued)

FOREIGN PATENT DOCUMENTS

EP        1569363 A1    8/2005

OTHER PUBLICATIONS

International Search Report and Written Opinion mailed on Jan. 19, 2022, received for PCT Application PCT/EP2021/071352, filed on Jul. 29, 2021, 17 pages.
(Continued)

*Primary Examiner* — Tanmay K Shah
(74) *Attorney, Agent, or Firm* — XSENSUS LLP

(57) ABSTRACT

A method for operating a communications device is provided. The communications device is configured to transmit uplink signals to and/or to receive downlink signals from a non-terrestrial infrastructure equipment forming part of a non-terrestrial network, NTN, and to transmit uplink signal to and/or to receive uplink signals from a terrestrial infrastructure equipment forming part of a terrestrial network, TN. The method comprises communicating with the non-terrestrial infrastructure equipment via one of a plurality of spot beams, each of the spot beams providing a first wireless access interface for transmitting the uplink signals to and/or receiving the downlink signals from the non-terrestrial infrastructure equipment within a coverage region formed by the each of the spot beams, and communicating with the terrestrial infrastructure equipment via a second wireless access interface provided by the terrestrial infrastructure equipment.

22 Claims, 7 Drawing Sheets

(58) Field of Classification Search
    USPC ......................................................... 455/427
    See application file for complete search history.

(56)                References Cited

U.S. PATENT DOCUMENTS

2008/0242330 A1* 10/2008 Singh ................. H04B 7/18532
                                                              455/509
2008/0287124 A1    11/2008 Karabinis
2020/0228194 A1     7/2020 Hassan Hussein et al.

OTHER PUBLICATIONS

ETSI, "Multi-access Edge Computing (MEC)", European Telecommunications Standards Institute (ETSI), Available Online at: https://www.etsi.org/technologies/multi-access-edge-computing, Accessed on Jul. 2020, pp. 1-7.

Sabella et al., "Toward fully connected vehicles: Edge computing for advanced automotive communications", White Paper Available Online at: https://5gaa.org/wp-content/uploads/2017/12/5GAA_T-170219-whitepaperEdgeComputing_5GAA.pdf, Dec. 2017, pp. 1-19.
Holma et al., "LTE for UMTS OFDMA and SC-FDMA Based Radio Access", John Wiley & Sons, 2009, 232 pages.
NTT Docomo, Inc., "Revised WID on New Radio Access Technology", 3GPP TSG RAN Meeting #78, RP-172834, Dec. 18-21, 2017, 11 pages.
3GPP, "Study on New Radio (NR) to support non terrestrial networks (Release 15)", 3GPP TR 38.811 V0.3.0, Dec. 2017, pp. 1-56.
3GPP, "Study on Scenarios and Requirements for Next Generation Access Technologies; (Release 14)", 3GPP TR 38.913 V14.3.0, Jun. 2017, pp. 1-39.
3GPP, "NR; Medium Access Control (MAC) protocol specification (Release 15)", 3GPP TS 38.321 V15.4.0, Dec. 2018, pp. 1-77.

* cited by examiner

METHODS, COMMUNICTIONS DEVICES, AND NON-TERRESTRIAL INFRASTRUCTURE EQUIPMENT

CROSS-REFERENCE TO RELATED APPLICATIONS

The present application is based on PCT filing PCT/EP2021/071352, filed Jul. 29, 2021, which claims the Paris Convention priority from European patent application number EP20189031.6, filed Jul. 31, 2020, the contents of each are hereby incorporated by reference.

BACKGROUND

Field of Disclosure

The present disclosure relates generally to Non-Terrestrial Networks, NTNs, and specifically to methods of reducing latency in NTNs.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes so-called "non-terrestrial networks", or NTN for short. 3GPP has proposed in Release 15 of the 3GPP specifications to develop technologies for providing coverage by means of one or more antennas mounted on airborne or space-borne vehicles [1].

Non-terrestrial networks may provide service in areas that cannot be covered by terrestrial cellular networks (i.e. those where coverage is provided by means of land-based antennas), such as isolated or remote areas, on board aircraft or vessels) or may provide enhanced service in other areas. The expanded coverage that may be achieved by means of non-terrestrial networks may provide service continuity for machine-to-machine (M2M) or 'internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment and requirements for coverage enhancement give rise to new challenges for efficiently handling communications in wireless communications systems that need to be addressed.

SUMMARY OF THE DISCLOSURE

The present disclosure can help address or mitigate at least some of the issues discussed above.

Some embodiments of the present technique can provide a method for operating a communications device. The communications device is configured to transmit uplink signals to and/or to receive downlink signals from a non-terrestrial infrastructure equipment forming part of a non-terrestrial network, NTN, and to transmit uplink signal to and/or to receive downlink signals from a terrestrial infrastructure equipment forming part of a terrestrial network, TN. The method comprises communicating with the non-terrestrial infrastructure equipment via one of a plurality of spot beams, each of the spot beams providing a first wireless access interface for transmitting the uplink signals to and/or receiving the downlink signals from the non-terrestrial infrastructure equipment within a coverage region formed by the each of the spot beams, and communicating with the terrestrial infrastructure equipment via a second wireless access interface provided by the terrestrial infrastructure equipment. The communications device is configured to operate in accordance with a dual connectivity mode of operation, the dual connectivity mode of operation comprising either transmitting the uplink signals to the terrestrial infrastructure and receiving the downlink signals from the non-terrestrial infrastructure equipment or transmitting the uplink signals to the non-terrestrial infrastructure equipment and receiving the downlink signals from the terrestrial infrastructure equipment.

Other embodiments of the present technique can provide a method for operating a communications device. The communications device is configured to transmit uplink signals to and/or to receive downlink signals from a non-terrestrial infrastructure equipment forming part of a non-terrestrial network, NTN. The method comprises communicating with the non-terrestrial infrastructure equipment via one of a plurality of spot beams, each of the spot beams providing a first wireless access interface for transmitting the uplink signals to and/or receiving the downlink signals from the non-terrestrial infrastructure equipment within a coverage region formed by the each of the spot beams, and caching data received from the non-terrestrial infrastructure equipment via the downlink signals using a multi-access edge computing, MEC, function at the communications device.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
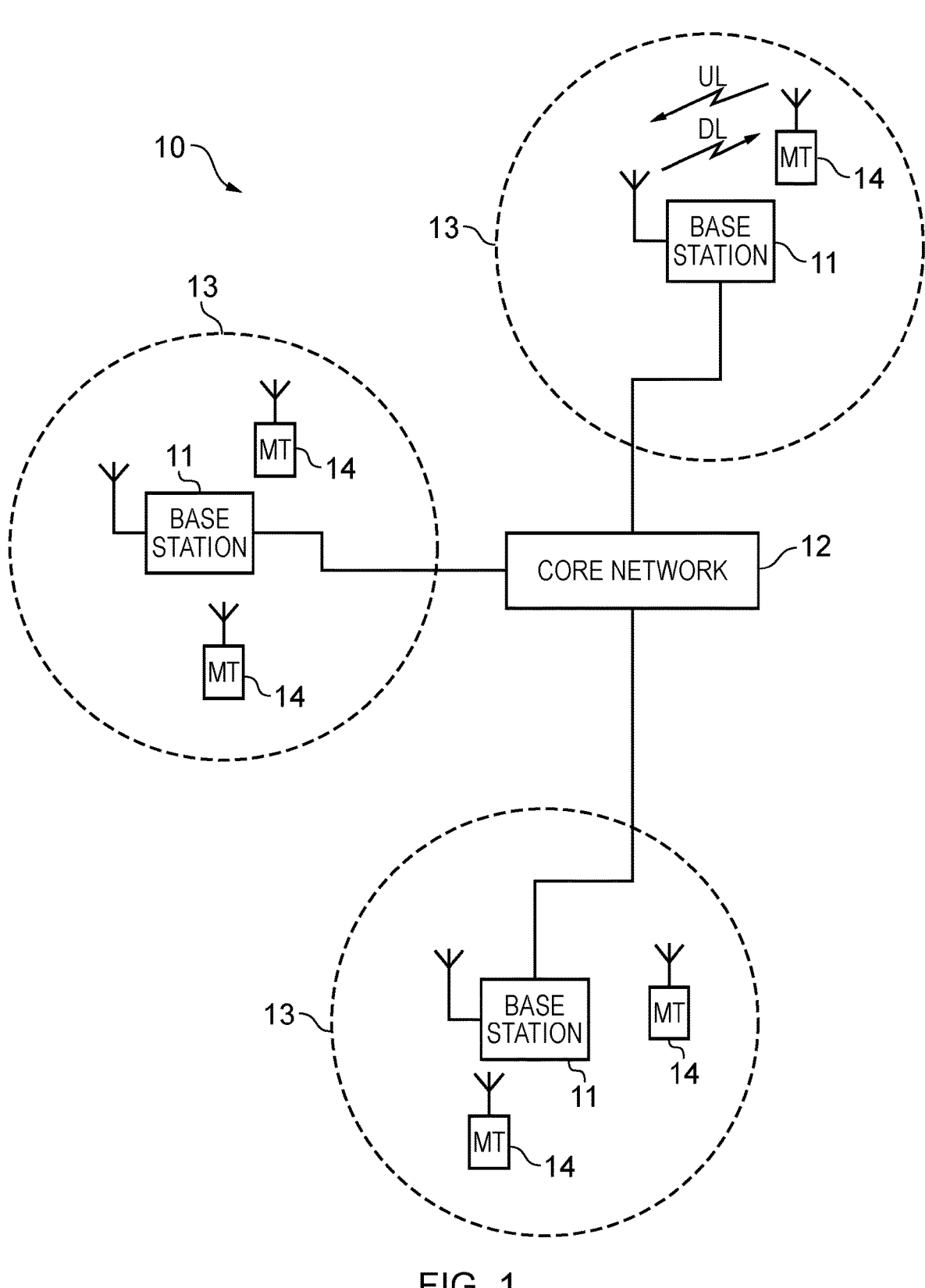
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present disclosure can also find application with advanced wireless communications systems such as those referred to as 5G or New Radio (NR) Access Technology. The use cases that are considered for NR include:

Enhanced Mobile Broadband (eMBB)

Massive Machine Type Communications (mMTC)

Ultra Reliable & Low Latency Communications (URLLC) [3]

eMBB services are characterised by high capacity with a requirement to support up to 20 Gb/s. The requirement for URLLC is a reliability of $1\text{-}10^{-5}$ (99.999%) for one transmission of a relatively short packet, for example a 32 byte packet with a user plane latency of 1 ms [4].

The elements of the wireless access network shown in FIG. 1 may be equally applied to a 5G new RAT configuration, except that a change in terminology may be applied as mentioned above.

Figure 2:
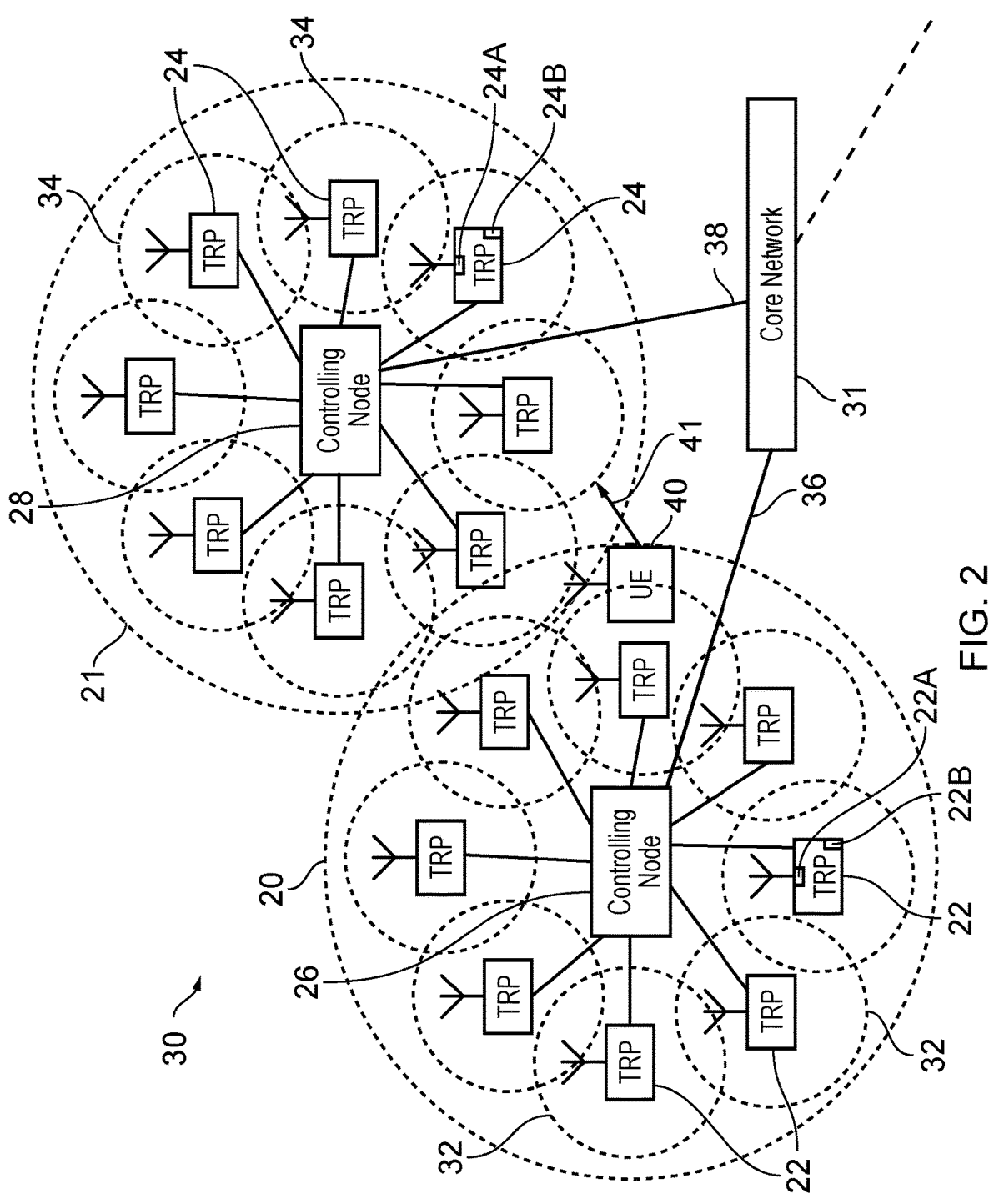
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links The distributed units 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Non-Terrestrial Networks (NTNs)

Figure 3:
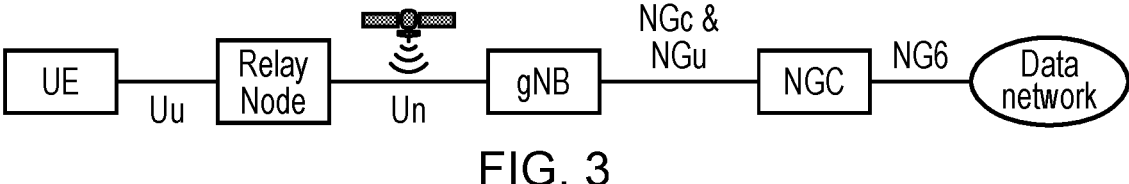
FIG. 3 is reproduced from [1], and illustrates a first example of a non-terrestrial network (NTN) featuring an access networking service relay node and based on a satellite/aerial with a bent pipe payload.
Figure 4:
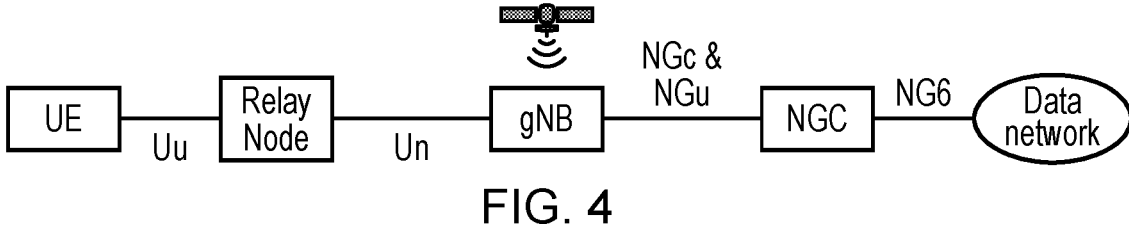
FIG. 4 is reproduced from [1], and illustrates a second example of an NTN featuring an access networking service relay node and based on a satellite/aerial connected to a gNodeB.

An overview of NR-NTN can be found in [1], and much of the following wording, along with FIGS. 3 and 4, has been reproduced from that document as a way of background.

As a result of the wide service coverage capabilities and reduced vulnerability of space/airborne vehicles to physical attacks and natural disasters, Non-Terrestrial Networks are expected to:

foster the roll out of 5G service in un-served areas that cannot be covered by terrestrial 5G network (isolated/remote areas, on board aircrafts or vessels) and under-served areas (e.g. sub-urban/rural areas) to upgrade the performance of limited terrestrial networks in cost effective manner;

reinforce the 5G service reliability by providing service continuity for M2M/IoT devices or for passengers on board moving platforms (e.g. passenger vehicles-aircraft, ships, high speed trains, bus) or ensuring service availability anywhere especially for critical communications, future railway/maritime/aeronautical communications; and to enable 5G network scalability by providing efficient multicast/broadcast resources for data delivery towards the network edges or even user terminal.

The benefits relate to either Non-Terrestrial Networks operating alone or to integrated terrestrial and Non-Terrestrial networks. They will impact at least coverage, user bandwidth, system capacity, service reliability or service availability, energy consumption and connection density. A role for Non-Terrestrial Network components in the 5G system is expected for at least the following verticals: transport, Public Safety, Media and Entertainment, eHealth, Energy, Agriculture, Finance and Automotive.

FIG. 3 illustrates a first example of an NTN featuring an access networking service relay nodes and based on a satellite/aerial with a bent pipe payload, meaning that the same data is sent back down to Earth as is received by the satellite/aerial, with only frequency or amplification changing; i.e. acting like a pipe with a u-bend. In this example NTN, the satellite or the aerial will therefore relay a "satellite friendly" NR signal between the gNodeB and the relay nodes in a transparent manner.

FIG. 4 illustrates a second example of an NTN featuring an access networking service relay node and based on a satellite/aerial comprising a gNodeB. In this example NTN, the satellite or aerial embarks full or part of a gNodeB to generate or receive a "satellite friendly" NR signal to/form the relay nodes. This requires sufficient on-board processing capabilities to be able to include a gNodeB or relay node functionality.

Relay node (RN) related use cases such as those shown in FIGS. 3 and 4 will play an important role in the commercial deployment of NTN; i.e. relay nodes mounted on high speed trains, relay nodes mounted in cruise ships, relay nodes at home/office and relay nodes mounted on airliners. It should be well understood by those skilled in the art that the proposed solutions of embodiments of the present technique could be equally applied to conventional UEs and RNs.

Figure 5:
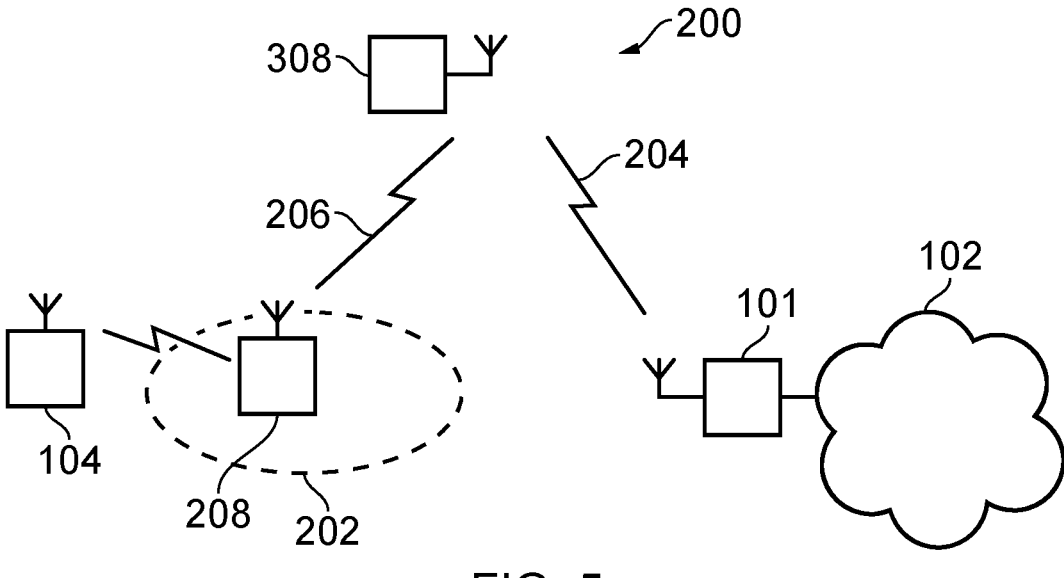
FIG. 5 schematically shows an example of a wireless communications system comprising an NTN part and a terrestrial network (TN) part which may be configured to operate in accordance with embodiments of the present disclosure.

FIG. 5 schematically shows an example of a wireless communications system 200 which may be configured to operate in accordance with embodiments of the present disclosure. The wireless communications system 200 in this example is based broadly around an LTE-type or 5G-type architecture. Many aspects of the operation of the wireless communications system/network 200 are known and understood and are not described here in detail in the interest of brevity. Operational aspects of the wireless communications system 200 which are not specifically described herein may be implemented in accordance with any known techniques, for example according to the current LTE-standards or the proposed 5G standards.

The wireless communications system 200 comprises a core network part 102 (which may be a 4G core network or a 5G core network) in communicative connection with a radio network part. The radio network part comprises a base station (g-node B) 101 connected to a non-terrestrial network part 308. The non-terrestrial network part 308 may be an example of infrastructure equipment. Alternatively, or in addition, the non-terrestrial network part 308 may be mounted on a satellite vehicle or on an airborne vehicle.

The non-terrestrial network part 308 may communicate with a communications device 208, located within a cell 202, by means of a wireless access interface provided by a wireless communications link 206. For example, the cell 202 may correspond to the coverage area of a spot beam generated by the non-terrestrial network part 308. The boundary of the cell 202 may depend on an altitude of the non-terrestrial network part 308 and a configuration of one or more antennas of the non-terrestrial network part 308 by which the non-terrestrial network part 308 transmits and receives signals on the wireless access interface.

The non-terrestrial network part 308 may be a satellite in an orbit with respect to the Earth, or may be mounted on such a satellite. For example, the satellite may be in a geo-stationary earth orbit (GEO) such that the non-terrestrial network part 308 does not move with respect to a fixed point on the Earth's surface. The geo-stationary earth orbit may be approximately 36,786 km above the Earth's equator. The satellite may alternatively be in a low-earth orbit (LEO), in which the non-terrestrial network part 308 may complete an orbit of the Earth relatively quickly, thus providing moving cell coverage. Alternatively, the satellite may be in a non-geostationary orbit (NGSO), so that the non-terrestrial network part 308 moves with respect to a fixed point on the Earth's surface. The non-terrestrial network part 308 may be an airborne vehicle such as an aircraft, or may be mounted on such a vehicle. The airborne vehicle (and hence the non-terrestrial network part 308) may be stationary with respect to the surface of the Earth or may move with respect to the surface of the Earth.

In FIG. 5, the base station 101 is shown as ground-based, and connected to the non-terrestrial network part 308 by means of a wireless communications link 204. The non-terrestrial network part 308 receives signals representing downlink data transmitted by the base station 101 on the wireless communications link 204 and, based on the received signals, transmits signals representing the downlink data via the wireless communications link 206 providing the wireless access interface for the communications device 206. Similarly, the non-terrestrial network part 308 receives signals representing uplink data transmitted by the communications device 206 via the wireless access interface comprising the wireless communications link 206 and transmits signals representing the uplink data to the base station 101 on the wireless communications link 204. The wireless communications links 204, 206 may operate at a same frequency, or may operate at different frequencies.

The extent to which the non-terrestrial network part 308 processes the received signals may depend upon a processing capability of the non-terrestrial network part 308. For example, the non-terrestrial network part 308 may receive signals representing the downlink data on the wireless communication link 204, amplify them and (if needed) re-modulate onto an appropriate carrier frequency for onwards transmission on the wireless access interface provided by the wireless communications link 206. Alternatively, the non-terrestrial network part 308 may be configured to decode the signals representing the downlink data received on the wireless communication link 204 into un-encoded downlink data, re-encode the downlink data and modulate the encoded downlink data onto the appropriate carrier frequency for onwards transmission on the wireless access interface provided by the wireless communications link 206.

The non-terrestrial network part 308 may be configured to perform some of the functionality conventionally carried out by the base station 101. In particular, latency-sensitive functionality (such as acknowledging a receipt of the uplink data, or responding to a RACH request) may be performed by the non-terrestrial network part 308 as the base station 101.

The base station 101 may be co-located with the non-terrestrial network part 308; for example, both may be mounted on the same satellite vehicle or airborne vehicle, and there may be a physical (e.g. wired, or fibre optic) connection on board the satellite vehicle or airborne vehicle, providing the coupling between the base station 101 and the non-terrestrial network part 308. In such co-located arrangements, a wireless communications feeder link between the base station 101 and a ground station (not shown) may provide connectivity between the base station 101 and the core network part 102.

The communications device 208 shown in FIG. 5 may be configured to act as a relay node. That is, it may provide connectivity to one or more terminal devices such as the terminal device 104. When acting as a relay node, the communications device 208 transmits and receives data to and from the terminal device 104, and relays it, via the non-terrestrial network part 308 to the base station 101. The communications device 208, acting as a relay node, may thus provide connectivity to the core network part 102 for terminal devices which are within a transmission range of the communications device 208.

It will be apparent to those skilled in the art that many scenarios can be envisaged in which the combination of the communications device 208 and the non-terrestrial network part 308 can provide enhanced service to end users. For example, the communications device 208 may be mounted on a passenger vehicle such as a bus or train which travels through rural areas where coverage by terrestrial base stations may be limited. Terminal devices on the vehicle may obtain service via the communications device 208 acting as a relay, which communicates with the non-terrestrial network part 308.

There is a need to ensure that connectivity for the communications device 208 with the base station 101 can be maintained, in light of the movement of the communications device 208, the movement of the non-terrestrial network part

308 (relative to the Earth's surface), or both. According to conventional cellular communications techniques, a decision to change a serving cell of the communications device 208 may be based on measurements of one or more characteristics of a radio frequency communications channel, such as signal strength measurements or signal quality measurements. In a terrestrial communications network, such measurements may effectively provide an indication that the communications device 208 is at, or approaching, an edge of a coverage region of a cell, since, for example, path loss may broadly correlate to a distance from a base station. However, such conventional measurement-based algorithms may be unsuitable for cells generated by means of the transmission of beams from a non-terrestrial network part, such as the cell 202 generated by the non-terrestrial network part 308. In particular, path loss may be primarily dependent on an altitude of the non-terrestrial network part 308 and may vary only to a very limited extent (if at all) at the surface of the Earth, within the coverage region of the cell 202. As a result, the strength of a received signal may be always lower than that from a terrestrial base station, which thus will always be selected when available.

A further disadvantage of conventional techniques may be the relatively high rate at which cell changes occur for the communications device 208 obtaining service from one or more non-terrestrial network parts. For example, where the non-terrestrial network part 308 is mounted on a satellite in a low-earth orbit (LEO), the non-terrestrial network part 308 may complete an orbit of the Earth in around 90 minutes; the coverage of a cell generated by the non-terrestrial network part 308 will move very rapidly, with respect to a fixed observation point on the surface of the Earth. Similarly, it may be expected that the communications device 208 may be mounted on an airborne vehicle itself, having a ground speed of several hundreds of kilometres per hour.

Multi-Access Edge Computing (MEC)

Multi-access edge computing (MEC), also referred to as edge computing or as mobile edge computing, is a type of network architecture which allows for cloud computing to be carried out at a mobile network edge. This allows for various functions and processes to be carried out away from the core network and thus much closer to the end user, vastly reducing latency and enabling higher bandwidth and real-time applications.

MEC, which is described in further detail in [5], is expected to play a large role in the wide-spread deployment of NR networks. Some use cases of MEC are listed in [5], and include:

- video analytics;
- location services;
- Internet-of-Things (IoT);
- augmented reality;
- optimised local content distribution; and
- data caching.

Sidelink and Vehicle-to-Everything (V2X) Communications

According to 3GPP standards such as LTE and NR, whilst downlink and uplink communications are specified for transmissions from an infrastructure equipment such as a gNB to a UE and from a UE to a gNB respectively, sidelink communications are specified to realise UE-to-UE (device-to-device (D2D)) communication, especially for sidelink discovery, sidelink communication and vehicle to everything (V2X) sidelink communication between UEs as well as between UEs and vehicular or roadside infrastructure. The LTE sidelink has the following characteristics as described below, which are reproduced from [6]:

Sidelink comprises sidelink discovery, sidelink communication, and V2X sidelink communication between UEs;

Sidelink uses uplink resources and a physical channel structure similar to uplink transmissions. However, some changes, noted below, are made to the physical channels;

The sidelink/D2D wireless access interface structure includes a physical sidelink control channel (PSCCH) for UEs to transmit control signalling to other UEs and a physical sidelink shared channel (PSSCH) for transmitting data to other UEs. Control messages transmitted on the PSCCH can indicate communications resources of the PSSCH via which the UE will transmit data to another UE. The control message for sidelink is referred to as sidelink control information (SCI). Therefore the PSCCH is mapped to the sidelink control resources and indicates resource and other transmission parameters used by a UE for PSSCH;

Sidelink transmission uses the same basic transmission scheme as the uplink transmission scheme. However, sidelink is limited to single cluster transmissions for all the sidelink physical channels. Furthermore, sidelink uses a one symbol gap at the end of each sidelink sub-frame. For V2X sidelink communication, PSCCH and PSSCH are transmitted in the same subframe;

The sidelink physical layer processing of transport channels differs from uplink transmission in the following steps:

Scrambling: for PSDCH and PSCCH, the scrambling is not UE-specific; and

Modulation: 256 QAM is not supported for sidelink 64 QAM is only supported for V2X sidelink communication;

For PSDCH (physical sidelink discovery channel), PSCCH and PSSCH demodulation, reference signals similar to uplink demodulation reference signals are transmitted in the fourth symbol of the slot in normal cyclic prefix (CP) and in the third symbol of the slot in extended cyclic prefix. The sidelink demodulation reference signals sequence length equals the size (number of sub-carriers) of the assigned resource. For V2X sidelink communication, reference signals are transmitted in the third and sixth symbols of the first slot and the second and fifth symbols of the second slot in normal CP;

For PSDCH and PSCCH, reference signals are created based on a fixed base sequence, cyclic shift and orthogonal cover code. For V2X sidelink communication, the cyclic shift for PSCCH is randomly selected in each transmission;

For in-coverage operation, the power spectral density of the sidelink transmissions can be influenced by the eNB; and For measurement on the sidelink, the following basic UE measurement quantities are supported:

Sidelink reference signal received power (S-RSRP);

Sidelink discovery reference signal received power (SD-RSRP);

PSSCH reference signal received power (PSSCH-RSRP); and

Sidelink reference signal strength indicator (S-RSSI).

Currently, for 5G or New Radio (NR) standardisation, a sidelink has been specified in Release-16 for V2X communication, with the LTE sidelink being a starting point for the NR sidelink For NR sidelink, the following sidelink physical channels are defined:

Physical Sidelink Shared Channel (PSSCH);

Physical Sidelink Broadcast Channel (PSBCH);

Physical Sidelink Control Channel (PSCCH); and

Physical Sidelink Feedback Channel (PSFCH).

Furthermore, the following sidelink physical signals are defined:

Demodulation reference signals (DM-RS);

Channel-state information reference signal (CSI-RS);

Phase-tracking reference signals (PT-RS);

Sidelink primary synchronization signal (S-PSS); and

Sidelink secondary synchronization signal (S-SSS).

Figure 6:
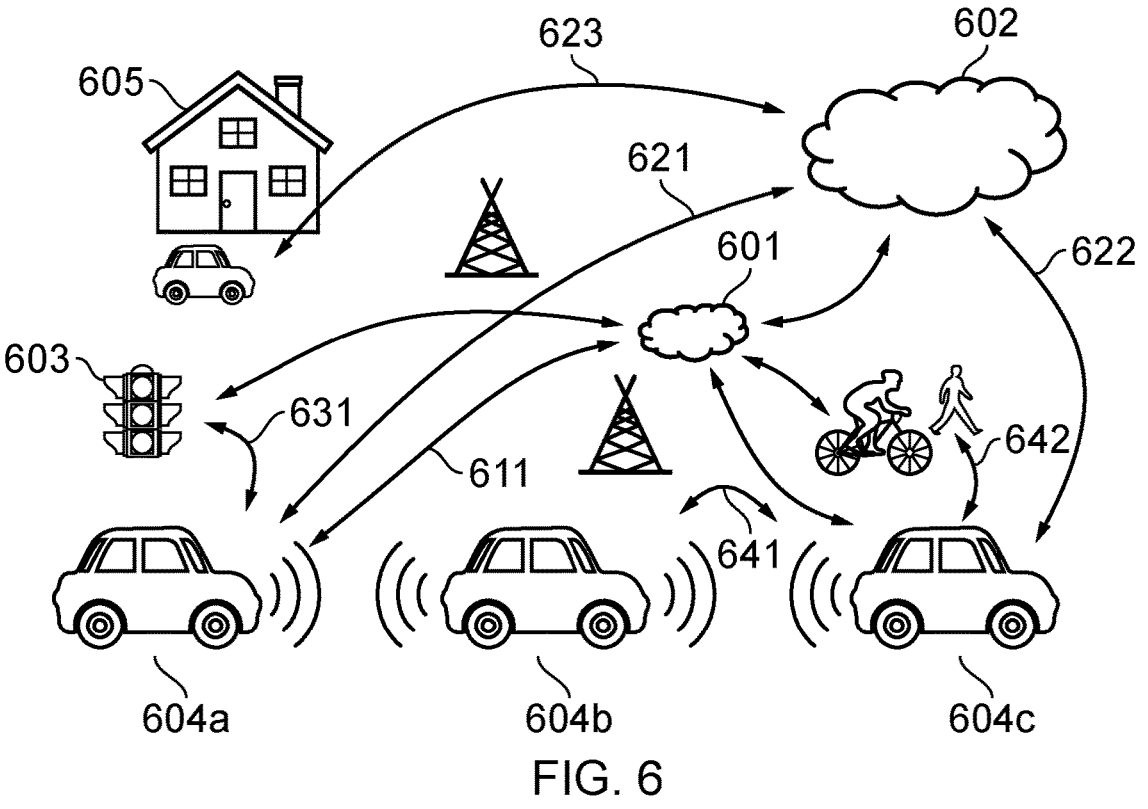
FIG. 6 shows an overview of Vehicle-to-Everything (V2X) communications.

FIG. 6 illustrates an overview of some ways in which V2X communications may operate, showing links between various infrastructure and UEs. The system of FIG. 6, which is based on a similar figure in [7], illustrates how connectivity to the mobile telecommunications network can be provided for vehicles 604a, 604b, 604c, which may each have their own sensors as well as user equipment, by the backend infrastructure 602, but also by the edge cloud 601 which is connected to the backend infrastructure 602.

The backend infrastructure 602 may provide connectivity to vehicles 604a and 604c in accordance with known LTE or NR standards for example (illustrated by arrows 621 and 622) and connectivity to a house 605 (which may be a smart home or the like, and at which vehicles may be parked) in accordance with NB-IoT or LTE Machine Type Communication (LTE-M, which includes enhanced MTC, eMTC) technologies for example (illustrated by arrow 623). However, such connectivity or services may be provided at a higher quality and/or with a lower latency via MEC, from edge cloud 601. For example, the same LTE or NR services as those provided by backend infrastructure 602 may be provided to vehicle 604a via MEC or enhanced Multimedia Broadcast Multicast Services (eMBMS) as illustrated by arrow 611. The edge cloud 601 (or indeed, backend infrastructure 602 directly) may provide connectivity to road side infrastructure, such as traffic lights 603, which may then transmit or relay LTE or NR signals (illustrated by arrow 631) to vehicle 604a in accordance with V2X (or more specifically here, vehicle to infrastructure (V2I)) communications.

Vehicles 604a, 604b, 604c may then be configured to communicate (e.g. LTE or NR signals) with each other or with pedestrians in accordance with V2X (or more specifically here, vehicle to vehicle (V2V) or vehicle to pedestrian (V2P)) communications, as illustrated by arrows 641 and 642 respectively.

Latency in NTN

The round trip time (RTT) between the UE and the satellite is a major contributor to the overall delay experienced in an NTN system or deployment. Such a delay may be acceptable for applications such as browsing, but not for conversational or delay sensitive traffic. NTN deployment may foresee supporting services such as video streaming, video calling, and other conversational services. This is because the user may wish to access and enjoy the same services as when connected to a Terrestrial Network (TN), and therefore will expect an NTN to provide the same experience/performance as a TN while connected to an NTN deployment.

The other main contributor to latency/delay is the distance between earth stations, and for UEs in the overlapping region between two or more earth stations, an additional delay may be added if the feeder link is not reliable (i.e. more retransmissions are required) or if switching between feeder links is required. The distance between earth stations may be in the region of thousands of kilometers. This may cause additional delay if an application server or a MEC is deployed at only one of the earth stations for a UE, and if this UE therefore bounces between the coverage of the two earth stations.

Figure 7:
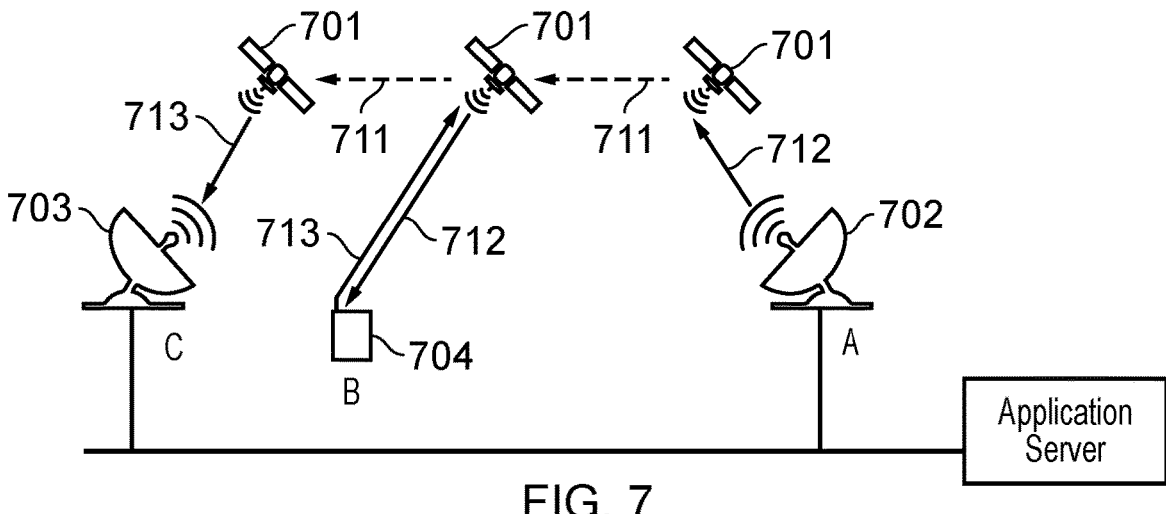
FIG. 7 illustrates movement of a satellite engaged in communication with a UE between two earth stations.

FIG. 7 shows an example of the movement (illustrated by dashed lines 711) of a satellite 701 between two earth stations 702, 703. As shown in FIG. 7, a UE 704 positioned at location B is in an overlapping region between the earth station 702 at location A and the earth station 703 at location C. It may be the case that the UE 704 at location B receives signals on the downlink 712, via satellite 701, from earth station A 702 and transmits signals on the uplink 713, via satellite 701, to the earth station 702 at location C.

Such an architecture of separate central unit user plane functions (CU-UP) via different paths is already permitted by 3GPP. In the architecture illustrated by FIG. 7, central unit control plane (CU-CP), CU-UP, and distributed unit (DU) functions reside at the earth station 702 at location A. CU-UP optionally may reside at the earth station 703 at location C. A MEC function may exist at the earth stations 702, 703 at either or both of locations A and C and cache video contents.

Such a problem as described above with respect to FIG. 7 may exist for non-overlapping regions as well due to RTT to/from a satellite. As described above, some communications services are very delay sensitive, and thus with the large latencies associated with NTN, are not always easy to provide to a UE when that UE is outside of the coverage of terrestrial networks.

Embodiments of the present disclosure seek to provide solutions to such problems, in particular by further reducing the RTT delay, delay due to feeder link switches, and delay introduced by the backhaul between earth stations for a UE in an overlapping region between two earth stations.

Reducing Latency in NTN With Dual Connectivity

Figure 8:
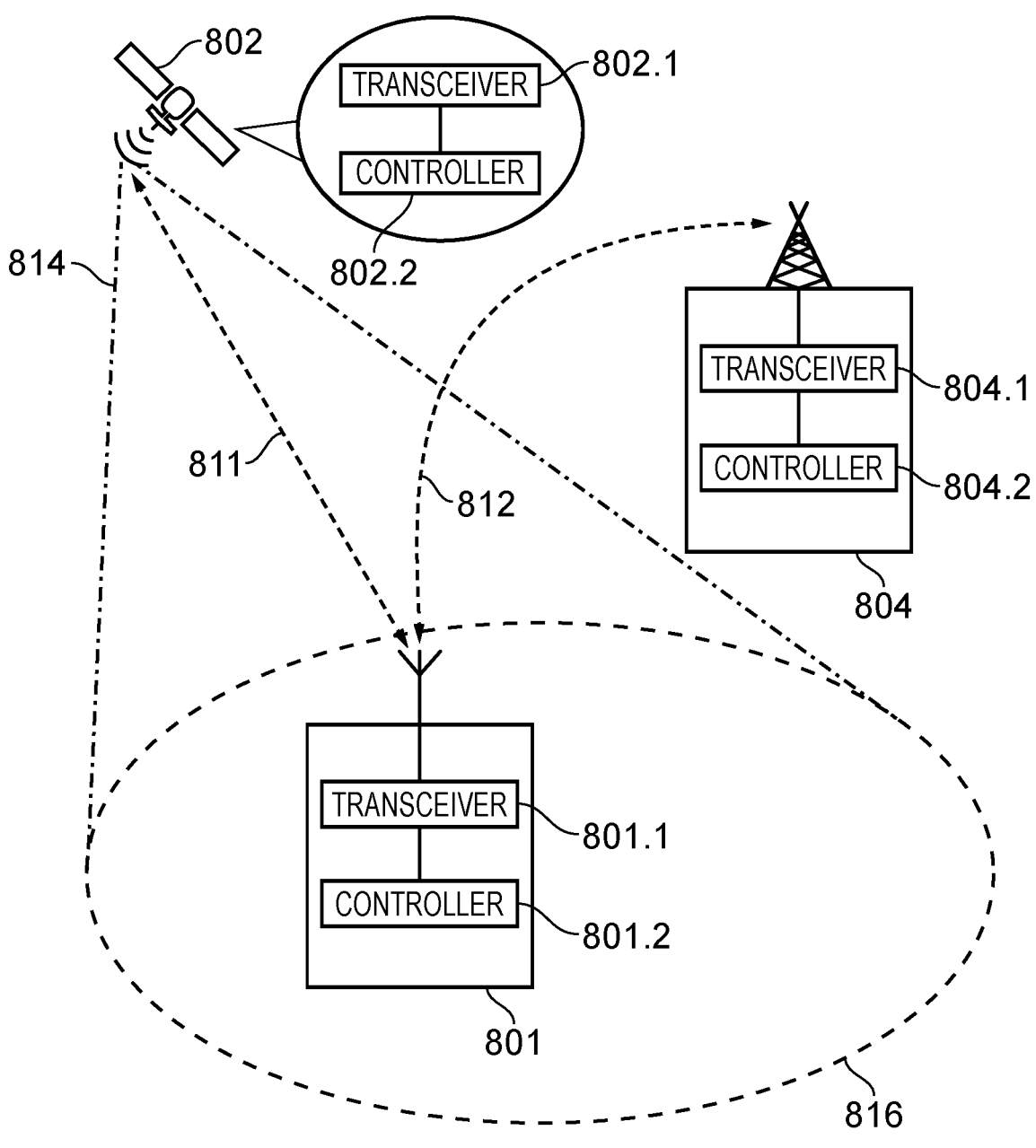
FIG. 8 shows a schematic representation of a first wireless communications system in accordance with embodiments of the present technique.

FIG. 8 shows schematic representation of a first wireless communications system comprising a communications device 801, a non-terrestrial infrastructure equipment 802 forming part of a non-terrestrial network, NTN, and a terrestrial infrastructure equipment 804 forming part of a terrestrial network, TN. The communications device 801 is configured to transmit uplink signals to and/or to receive downlink signals from the non-terrestrial infrastructure equipment 802 and to transmit uplink signals to and/or to receive downlink signals from the terrestrial infrastructure equipment 804. In the following description reference to a coverage area being formed by a spot beam provided by a non-terrestrial network infrastructure equipment such as non-terrestrial infrastructure equipment 802 should also be interpreted as being a cell as an alternative because each spot beam may have one or more cell identities, in which case there is cell selection/reselection.

The communications device 801, non-terrestrial infrastructure equipment 802 and terrestrial infrastructure equipment 804 each comprises a transceiver (or transceiver circuitry) 801.1, 802.1, 804.1 and a controller (or controller circuitry) 801.2, 802.2, 804.2. Each of the controllers 801.2, 802.2, 804.2 may be, for example, a microprocessor, a CPU, or a dedicated chipset, etc. The transceivers (or transceiver circuitry) 801.1, 802.1, 804.1 of one or each of the communications device 801, non-terrestrial infrastructure equipment 802 and terrestrial infrastructure equipment 804 may comprise both a transmitter and a receiver, or may—instead of being a transceiver—be a standalone transmitter and receiver pair. It would be appreciated by those skilled in the art that the non-terrestrial infrastructure equipment 802 and/or terrestrial infrastructure equipment 804 (as well as in some arrangements the communications device 801 and any other infrastructure equipment or communications devices operating in accordance with embodiments of the present technique) may comprise a plurality of (or at least, one or more) transceivers (or transceiver circuitry) 801.1, 802.1, 804.1. For the non-terrestrial infrastructure equipment 802, these transceivers 802.1 may have a one-to-one relationship with the transmitted spot beams.

Specifically, as is shown by FIG. 8, the transceiver circuitry 801.1 and the controller circuitry 801.2 of the communications device 801 are configured in combination to communicate with the non-terrestrial infrastructure equipment 802 via one of a plurality of spot beams 814, each of the spot beams 814 providing a first wireless access interface 811 for transmitting the uplink signals to and/or receiving the downlink signals from the non-terrestrial infrastructure equipment 802 within a coverage region 816 formed by the each of the spot beams 814, and to communicate with the terrestrial infrastructure equipment 804 via a second wireless access interface 812 provided by the terrestrial infrastructure equipment 804. The communications device 801 is configured to operate in accordance with a dual connectivity mode of operation, the dual connectivity mode of operation comprising either transmitting the uplink signals to the terrestrial infrastructure 804 and receiving the downlink signals from the non-terrestrial infrastructure equipment 802 or transmitting the uplink signals to the non-terrestrial infrastructure equipment 802 and receiving the downlink signals from the terrestrial infrastructure equipment 804.

In the example communications system shown in FIG. 8, and in accordance with embodiments of the present technique, the non-terrestrial infrastructure equipment 802 may be one of a satellite, an airborne vehicle or an airborne platform. In the example communications system shown in FIG. 8, and in accordance with embodiments of the present technique, the communications device 801 may be a user equipment, or alternatively (or in addition) may be acting as a relay node for one or more user equipment, each of the one or more user equipment being in one of a Radio Resource Control (RRC) connected state/mode, an RRC idle state or an RRC inactive state. Each of such RRC states are well known to those skilled in the art.

The non-terrestrial infrastructure equipment 802 may be configured to relay the uplink signals received by the non-terrestrial infrastructure equipment 802 from the communications device 801 to a first ground infrastructure equipment (such as ground station 702 as shown in FIG. 7) forming part of the non-terrestrial network, and to relay the downlink signals to the communications device 801 from a second ground infrastructure equipment (such as ground station 703 as shown in FIG. 7) forming part of the non-terrestrial network.

Essentially, these embodiments of the present technique provide solutions to the problem of how to reduce latency in NTN by utilising dual connectivity at the UE. In particular, if one of the uplink or downlink traffic is heavier than the other, or transmitted via a longer route than the other, than utilising a connection to a terrestrial gNB will be more efficient and reduce latency of the NTN.

Referring to FIG. 7, the ground station 703 at location C could instead be a terrestrial gNB/base station, and as this is relatively close to location B where the UE 704 is located, this may reduce the distance and latency of signals exchanged between the UE 704 and base station. If traffic is sent to this terrestrial base station, then the round trip time towards a satellite (such as satellite 701) can be negated. It may be the case that heavy downlink traffic is sent from the satellite, while lighter uplink traffic (for example, mostly including application layer acknowledgements) may be sent to the terrestrial base station.

Figures 9, 10:
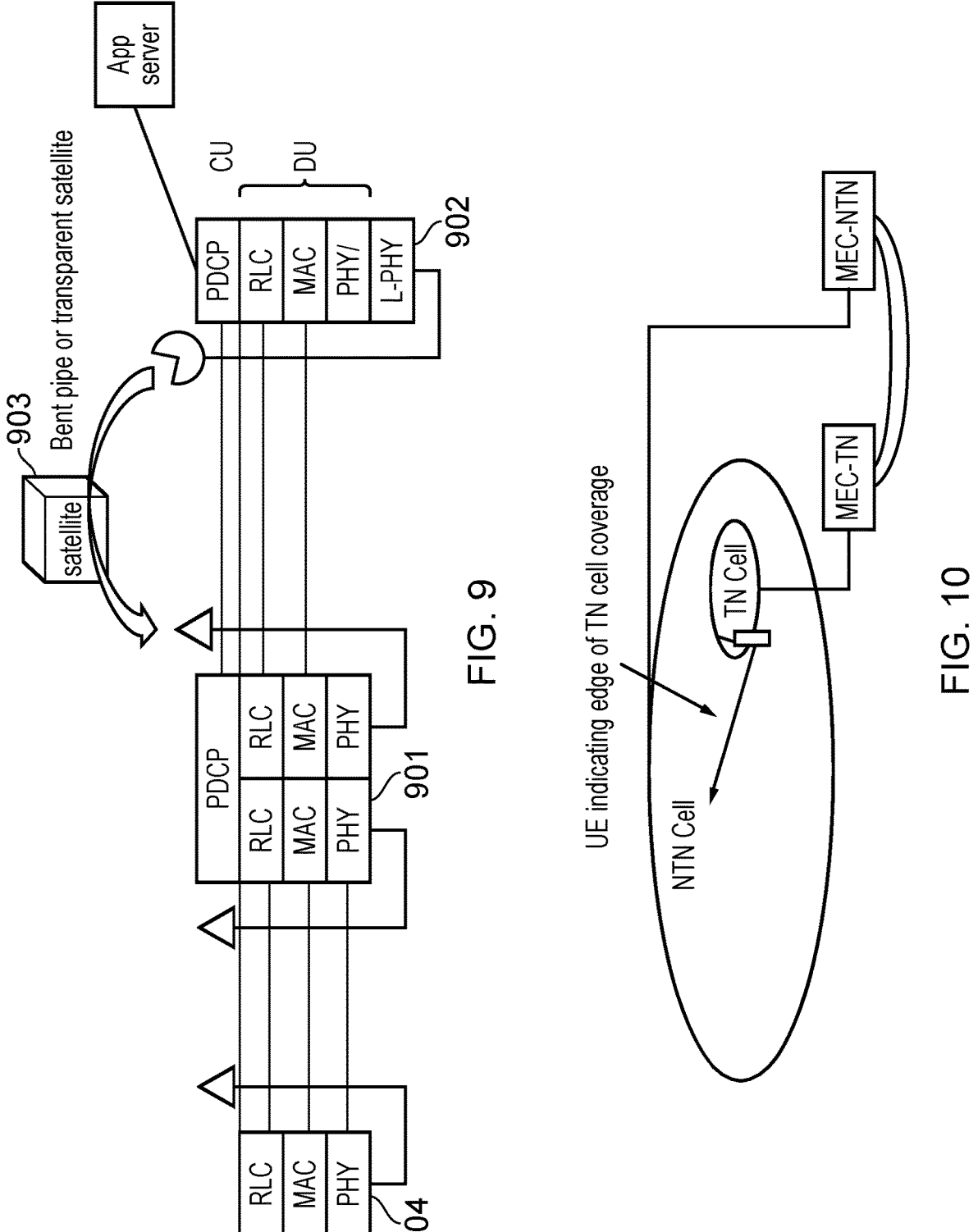
FIG. 9 illustrates an example protocol stack for a UE operating in dual connectivity with a TN base station and an NTN base station.
FIG. 10 illustrates how MEC functionality may be prepared for an NTN cell when a UE which is operating in dual connectivity with a TN base station and an NTN base station is moving out of range of the TN base station.

An example protocol stack for such a dual connectivity arrangement is shown by FIG. 9. As can be seen in FIG. 9, the earth station 902 connected to the satellite 903 (which may each separately or in combination be understood as being a non-terrestrial infrastructure equipment as shown and described with respect to FIG. 8) may be, in the dual connectivity arrangement, a master gNB (MgNB), while the terrestrial gNB 904 may be a secondary gNB (SgNB). Those skilled in the art would of course appreciate that the terrestrial gNB 903 could instead be the MgNB and the non-terrestrial gNB 902, 903 the SgNB. The following description of embodiments of the present technique however are described in view of the MgNB being the non-terrestrial gNB 902, 903 and the SgNB being the terrestrial gNB 903, though the skilled person would understand that embodiments of the present disclosure could equally apply the other way. The functions as defined by embodiments of the present disclosure at each of the earth station 902, satellite 903, terrestrial base station 904 and UE 901 as shown in the protocol stack of FIG. 9 may be as follows:

Earth station functions:
Packet Data Convergence Protocol (PDCP) for the UE/bearer;
Radio Link Control (RLC), Medium Access Control (MAC), Physical (PHY)-upper layer;
PHY lower layer for uplink to the satellite;
Connection to the Core Network (CN) and/or Application (app) server;
Connection to the terrestrial base station via X2 interface;
CU at the earth station may configure TN capable UEs to report nearby TN cells via, for example, ANR reporting.
Satellite functions:
Transmit/receive Physical layer signal (no processing of data), i.e. transparent mode.
Terrestrial base station functions:
RLC, MAC, PHY for the UE/bearer;
Connection/backhaul link to earth station;
Connection via X2 interface with the satellite gNB;
gNB may configure NTN capable UEs to report nearby NTN cells via, for example, ANR reporting. Such ANR impacts on UE reporting are discussed below.
UE functions:
Configuration of dual connectivity;
PHY may transmit/receive on different frequency bands;
UE may support new ANR function of reporting either the satellite cells to the terrestrial network or the terrestrial network cells to the satellite based gNB, or both;
If the UE is reporting the satellite cells, then it may report all cell access related Information Elements (IEs) (satellite Public Land Mobile Network (PLMN), cell ID, satellite type/beam information, ephemeris information etc., if included in SIB1) as part of ANR reporting;

Normally a gNB (either TN or NTN gNB) will prepare and maintain a table (i.e. a neighbour cell list) for the X2 interface and each reported cell in ANR report is compared against this table. If there is no entry for a reported cell then gNB is configured to use its own procedure to find the IP address of this new cell/gNB.

As described above, the communications device may be configured to transmit the uplink signals in a first frequency band and to receive the downlink signals in a second frequency band, wherein the first frequency band is different to the second frequency band.

Initiation of the dual connectivity mode of operation may be based on signalling information received from the NTN network (i.e. via the non-terrestrial infrastructure equipment) and switching operations, based on this signalling information, from an NTN mode of operation in which the communications device is configured to transmit the uplink signals to and receive the downlink signals from the non-terrestrial infrastructure equipment to the dual connectivity mode of operation. The non-terrestrial infrastructure equipment may be configured to detect that either a time taken for one of the uplink signals to be transmitted or a time taken for one of the downlink signals to be received is longer than a threshold time, and to transmit the signalling information in response to detecting that either the time taken for one of the uplink signals to be transmitted or the time taken for one of the downlink signals to be received is longer than the threshold. This threshold time may be predefined, and may vary for different types of data or services transmitted by the uplink/downlink signals, or may be configurable by the network.

As described above, the communications device may be configured to report either the satellite cells to the terrestrial network or the terrestrial network cells to the satellite based gNB as part of a self-organising network automatic neighbour relation (SON-ANR) process or normal handover related measurements. That is, the communications device may be configured to receive a command from the non-terrestrial infrastructure equipment that the communications device is to provide the non-terrestrial infrastructure equipment with an indication of all terrestrial infrastructure equipment having a coverage region within which the communications device is located, to perform measurements on signals received from each of the terrestrial infrastructure equipment, and to transmit, to the non-terrestrial infrastructure equipment, a report comprising an indication of each of the terrestrial infrastructure equipment and/or an indication of the measurements performed on the signals received from each of the terrestrial infrastructure equipment. Alternatively, or additionally, the communications device may be configured to receive a command from the terrestrial infrastructure equipment that the communications device is to provide the terrestrial infrastructure equipment with an indication of all non-terrestrial infrastructure equipment providing a spot beam which forms a coverage region within which the communications device is located, to perform measurements on signals received from each of the non-terrestrial infrastructure equipment, and to transmit, to the terrestrial infrastructure equipment, a report comprising an indication of each of the non-terrestrial infrastructure equipment and/or a report comprising an indication of the measurements performed on the signals received from each of the non-terrestrial infrastructure equipment. As mentioned above, this report may comprise one or more of: satellite/NTN PLMN, NTN cell ID, satellite type/beam information, ephemeris information, and NTN tracking area code (TAC).

As described above, multi-access (or mobile) edge computing (MEC) is expected to play a large role in a number of applications of current and future 5G systems. One such application for MEC is in V2X communications. An MEC in a base station may collect data from vehicles. After the processing of the data at MEC, the base station sends the information onwards to other vehicles when and where appropriate. For example, as may be understood with reference to FIG. 6, vehicles may have sensors and therefore may monitor (and report to a base station) road surface conditions, obstacles, stranded break-down vehicles, traffic situations and so on. A MEC function at the base station collects this data from vehicles and may generate a map including potential risks. Then, the base station may broadcast (or indeed transmit via groupcast/unicast) the information/map to any vehicles in the relevant areas.

One challenge here is there will be out-of-coverage areas on roads, but the vehicle will always need a connection for the updating of the information and/or the receiving of the latest road status. One possible solution for this is again dual connectivity between NTN and TN, as shown in FIG. 9 for example, where communications device 901 may be deemed to be a vehicular UE. If the NTN is the MgNB and the TN is the SgNB, then the MEC may be deployed at the SgNB or close to SgNB in this example.

Of course, loss of TN coverage is not a problem unique to V2X communications, and embodiments of the present disclosure may provide solutions to UEs of any type losing TN coverage in various deployments.

One problem in this example scenario could be a time required for the MEC to be shifted from the TN gNB to the NTN earth station, or how a time for the NTN network to reach the MEC in the SgNB. If the UE loses its connection to the TN gNB (i.e. the SgNB), the UE still has a connection to MgNB. The UE may then report the SgNB failure to the MgNB in this case.

However, it may be too late to switch the MEC function based on the UE reported SgNB failure message, so a new message may be sent by the UE indicating that it will soon run out of SgNB coverage. Following this, the UE may then temporarily stop communication with the SgNB. In other words, the communications device may be configured to detect that the communications device is moving out of a coverage region of the terrestrial infrastructure equipment, to transmit an indication to the non-terrestrial infrastructure equipment that the communications device is moving out of the coverage region of the terrestrial infrastructure equipment, and to switch to an NTN mode of operation in which the communications device is configured to transmit the uplink signals to and receive the downlink signals from the non-terrestrial infrastructure equipment.

There are some solutions of early detection that the communications device is moving out of a coverage region of the terrestrial infrastructure equipment. One is signal strength based (e.g. RSRP), and the other is location based (e.g. zone or pre-defined map). The assumption of location based is V2X UE uses GNSS (e.g. GPS).

This indication from the UE may allow for an appropriate MEC strategy to be deployed. In other words, the non-terrestrial infrastructure equipment may be configured to prepare, in response to determining that the communications device will switch to the NTN mode of operation, a multi-access edge computing, MEC, function at the non-terrestrial infrastructure equipment, the MEC function controlling the caching of data received from and/or to be transmitted to the communications device. For example, the MEC may be prepared in the earth station in parallel of SgNB, or the MEC function is shifted to the earth station, or a fastest route may be found from the earth station to MEC in SgNB. In other words, the MEC function may be prepared as a new MEC function at the non-terrestrial infrastructure equipment in parallel to a MEC function at the terrestrial infrastructure equipment. Alternatively, the MEC function may be migrated as an existing MEC function from the terrestrial infrastructure equipment to the non-terrestrial infrastructure equipment. Alternatively, the non-terrestrial infrastructure equipment may be configured to determine, in response to determining that the communications device will switch operation to the NTN mode of operation, a most efficient path between the non-terrestrial infrastructure equipment and a multi-access edge computing, MEC, function at the terrestrial infrastructure equipment, the MEC function controlling the caching of data received from and/or to be transmitted to the communications device.

In addition, UE might upload the stored data so far via TN network just before moving to an NTN cell. This could reduce the load of NTN network. In other words, the communications device may be configured to transmit, to the terrestrial infrastructure equipment prior to switching to the NTN mode of operation, data stored at the communications device for transmission to one of the non-terrestrial infrastructure equipment and the terrestrial infrastructure equipment.

Embodiments of the present technique therefore propose that a new indication is sent from a UE to the MgNB indicating that it will soon run out of SgNB coverage. This indication may be sent by the SgNB to the MgNB as well. This new indication could be in the form of, for example, a measurement report. Currently defined measurement events include:

Event A1 (Serving becomes better than threshold);

Event A2 (Serving becomes worse than threshold);

Event A3 (Neighbour becomes offset better than SpCell);

Event A4 (Neighbour becomes better than threshold);

Event A5 (SpCell becomes worse than threshold1 and neighbour becomes better than threshold2);

Event A6 (Neighbour becomes offset better than SCell);

Event B1 (Inter RAT neighbour becomes better than threshold);

Event B2 (PCell becomes worse than threshold1 and inter RAT neighbour becomes better than threshold2);

Event I1 (Interference becomes higher than threshold);

Event C1 (The NR sidelink channel busy ratio is above a threshold);

Event C2 (The NR sidelink channel busy ratio is below a threshold);

Event V1 (The V2X sidelink channel busy ratio is above a threshold); and

Event V2 (The V2X sidelink channel busy ratio is below a threshold).

Since satellite measurement results are likely to be flat throughout the NTN cell coverage with very low RSRP values, the NTN cell as a neighbour cell is unlikely to satisfy the criteria for any of the events mentioned above. Therefore, a new event may be required where a serving cell is below the threshold AND all neighbouring cells on all frequencies are also below a threshold, effectively indicating the end of TN coverage. This may act as a trigger for an NTN receiver to be activated. However, most importantly, this will solve the above-described problem of allowing for a UE to indicate such an event to NTN gNB, so that MEC function migration management is able to be handled in a correct and efficient manner Such solutions as described above are illustrated by FIG. 10.

Alternatively, in an arrangement of embodiments of the present technique, rather than itself detecting that the UE is moving out of TN coverage, the UE may simply provide the NTN gNB with location reports, which may be periodic, aperiodic, on request by the NTN gNB, or in response to a trigger condition being met at the UE (such as low RSRP measurements of signals received from the TN gNB). Based on these location reports, the NTN gNB may itself determine that the UE is moving out of TN coverage, and take appropriate action; i.e. sending a command to the UE to switch to the NTN mode of operation where uplink signals are transmitted to and downlink signals are received from the MgNB NTN gNB.

Reducing Latency in NTN With a MEC Client in the UE

Figure 11:
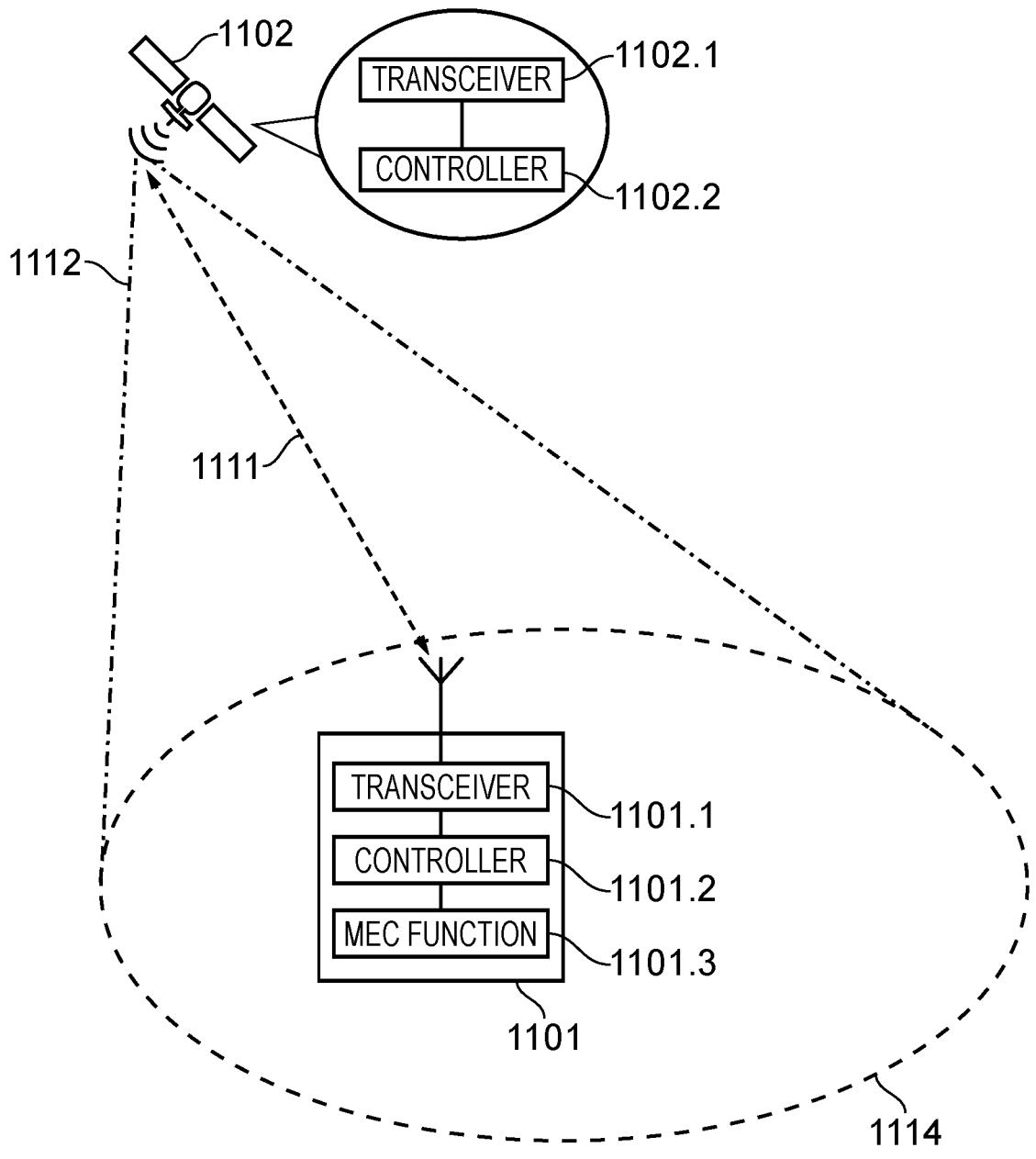
FIG. 11 shows a schematic representation of a second wireless communications system in accordance with embodiments of the present technique.

FIG. 11 shows schematic representation of a first wireless communications system comprising a communications device 1101, and a non-terrestrial infrastructure equipment 1102 forming part of a non-terrestrial network, NTN. The communications device 1101 is configured to transmit uplink signals to and/or to receive downlink signals from the non-terrestrial infrastructure equipment 1102. In the following description reference to a coverage area being formed by a spot beam provided by a non-terrestrial network infrastructure equipment such as non-terrestrial infrastructure equipment 1102 should also be interpreted as being a cell as an alternative because each spot beam may have one or more cell identities, in which case there is cell selection/reselection.

The communications device 1101 and non-terrestrial infrastructure equipment 1102 each comprises a transceiver (or transceiver circuitry) 1101.1, 1102.1 and a controller (or controller circuitry) 1101.2, 1102.2. Each of the controllers 1101.2, 1102.2 may be, for example, a microprocessor, a CPU, or a dedicated chipset, etc. The transceivers (or transceiver circuitry) 1101.1, 1102.1 of one or each of the communications device 1101 and non-terrestrial infrastructure equipment 1102 may comprise both a transmitter and a receiver, or may—instead of being a transceiver—be a standalone transmitter and receiver pair. It would be appreciated by those skilled in the art that the non-terrestrial infrastructure equipment 1102 (as well as in some arrangements the communications device 1101 and any other infrastructure equipment or communications devices operating in accordance with embodiments of the present technique) may comprise a plurality of (or at least, one or more) transceivers (or transceiver circuitry) 1101.1, 1102.1. For the non-terrestrial infrastructure equipment 1102, these transceivers 1102.1 may have a one-to-one relationship with the transmitted spot beams As can be seen in FIG. 11, the communications device 1101 may also comprise a multi-access edge computing, MEC, function 1101.3 at the communications device, which is configured to cache data received from the non-terrestrial infrastructure equipment 1102. Those skilled in the art would appreciate that, although not shown in FIG. 11, the non-terrestrial infrastructure equipment 1102 may have a MEC function too.

Specifically, as is shown by FIG. 11, the transceiver circuitry 1101.1 and the controller circuitry 1101.2 of the communications device 1101 are configured in combination to communicate with the non-terrestrial infrastructure equipment 1102 via one of a plurality of spot beams 1112, each of the spot beams providing a first wireless access interface 1111 for transmitting the uplink signals to and/or receiving the downlink signals from the non-terrestrial infrastructure equipment 1102 within a coverage region 1114 formed by the each of the spot beams 1112, and to cache data received from the non-terrestrial infrastructure equipment 1102 via the downlink signals at a data rate which is higher than a rate at which the data is consumed at the communications device 1101, the data being cached using the MEC function 1101.3.

In the example communications system shown in FIG. 11, and in accordance with embodiments of the present technique, the non-terrestrial infrastructure equipment 1102 may be one of a satellite, an airborne vehicle or an airborne platform. In the example communications system shown in FIG. 11, and in accordance with embodiments of the present technique, the communications device 1101 may be a user equipment, or alternatively (or in addition) may be acting as a relay node for one or more user equipment, each of the one or more user equipment being in one of a Radio Resource Control (RRC) connected state/mode, an RRC idle state or an RRC inactive state. Each of such RRC states are well known to those skilled in the art.

As with the example communications system illustrated by FIG. 8, in the example system of FIG. 11, the non-terrestrial infrastructure equipment 1102 may be configured to relay the uplink signals received by the non-terrestrial infrastructure equipment 1102 from the communications device 1101 to a first ground infrastructure equipment (such as ground station 702 as shown in FIG. 7) forming part of the non-terrestrial network, and to relay the downlink signals to the communications device 1101 from a second ground infrastructure equipment (such as ground station 703 as shown in FIG. 7) forming part of the non-terrestrial network.

Considering the long RTT in satellite systems, an earth station may pump a large burst of data to the UE so that applications such as video playback do not cause a user of the UE to experience delay. In order to do so, a MEC function may be configured at the earth station, and this MEC function may cache data from the application server. In order to further reduce the latency, embodiments of the present technique propose that another MEC/caching function may be introduced in the UE. For example, a video may be minutes long, and the transmission of the full content of this video may take 2 to 3 minutes worth of data being pumped to the UE via the satellite. A modem chipset in the UE may receive this data as normal. However, the data is cached above the modem chip and before the application function, by the MEC function in the UE. Stored data is then released to the application function by the MEC function based on the playback requirements.

In order to do so, a UE may signal its storage capacity or a combination of storage and processing capability to the satellite base station or the MEC function in the CN or to the application server using appropriate signalling. In other words, the communications device is configured to transmit, to the non-terrestrial infrastructure equipment, an indication of one or both of a storage capability of the communications device and a processing capability of the communications device, the one or both of the storage capability of the communications device and the processing capability of the communications device being used by the non-terrestrial infrastructure equipment to determine whether the data can be transmitted to the communications device via the downlink signals at the data rate for caching using the MEC function at the communications device.

If signalled to the base station, then the base station may use other existing features like DASH-Aware Network Element (DANE)/Dynamic Adaptive Streaming over HTTP (DASH) to communicate the required data rate with the application server or core network (to which the base station is connected) or communicate via the MEC entity at the base/earth station. In other words, the non-terrestrial infrastructure equipment is configured to transmit, to one of a core network and an application server configured to provide the data to the non-terrestrial infrastructure equipment, an indication of the data rate with which the non-terrestrial infrastructure equipment is to transmit the data to the communications device.

Those skilled in the art would appreciate that, though embodiments of the present technique have been described largely by way of the example communications systems shown in FIGS. 8 and 11, it would be clear to those skilled in the art that they could be equally applied to other systems to those described herein including where a UE with a MEC function as described above is operating in accordance with DC (dual connectivity) where for example UL traffic may be sent to a TN gNB and DL traffic sent to an NTN gNB.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device configured to transmit uplink signals to and/or to receive downlink signals from a non-terrestrial infrastructure equipment forming part of a non-terrestrial network, NTN, and to transmit uplink signal to and/or to receive uplink signals from a terrestrial infrastructure equipment forming part of a terrestrial network, TN, the method comprising communicating with the non-terrestrial infrastructure equipment via one of a plurality of spot beams, each of the spot beams providing a first wireless access interface for transmitting the uplink signals to and/or receiving the downlink signals from the non-terrestrial infrastructure equipment within a coverage region formed by the each of the spot beams, and communicating with the terrestrial infrastructure equipment via a second wireless access interface provided by the terrestrial infrastructure equipment, wherein the communications device is configured to operate in accordance with a dual connectivity mode of operation, the dual connectivity mode of operation comprising either transmitting the uplink signals to the terrestrial infrastructure and receiving the downlink signals from the non-terrestrial infrastructure equipment or transmitting the uplink signals to the non-terrestrial infrastructure equipment and receiving the downlink signals from the terrestrial infrastructure equipment.

Paragraph 2. A method according to Paragraph 1, wherein the communications device is configured to transmit the uplink signals in a first frequency band and to receive the downlink signals in a second frequency band, wherein the first frequency band is different to the second frequency band.

Paragraph 3. A method according to Paragraph 1 or Paragraph 2, comprising receiving signalling information from the NTN, and switching operation, based on the signalling information, from an NTN mode of operation in which the communications device is configured to transmit the uplink signals to and receive the downlink signals from the non-terrestrial infrastructure equipment to the dual connectivity mode of operation.

Paragraph 4. A method according to Paragraph 3, wherein the communications device is configured to receive the signalling information when either a time taken for one of the uplink signals to be transmitted or a time taken for one of the downlink signals to be received is longer than a threshold time.

Paragraph 5. A method according to any of Paragraph 1 to 4, comprising receiving a command from the non-terrestrial infrastructure equipment that the communications device is to provide the non-terrestrial infrastructure equipment with an indication of all terrestrial infrastructure equipment having a coverage region within which the communications device is located, performing measurements on signals received from each of the terrestrial infrastructure equipment, and transmitting, to the non-terrestrial infrastructure equipment, a report comprising an indication of each of the terrestrial infrastructure equipment and/or an indication of the measurements performed on the signals received from each of the terrestrial infrastructure equipment.

Paragraph 6. A method according to any of Paragraphs 1 to 5, comprising receiving a command from the terrestrial infrastructure equipment that the communications device is to provide the terrestrial infrastructure equipment with an indication of all non-terrestrial infrastructure equipment providing a spot beam which forms a coverage region within which the communications device is located, performing measurements on signals received from each of the non-terrestrial infrastructure equipment, and transmitting, to the terrestrial infrastructure equipment, a report comprising an indication of each of the non-terrestrial infrastructure equipment and/or a report comprising an indication of the measurements performed on the signals received from each of the non-terrestrial infrastructure equipment.

Paragraph 7. A method according to Paragraph 6, wherein the report comprises one or more of: an indication of a public land mobile network, PLMN, of each of the non-terrestrial infrastructure equipment, a cell ID of each of the non-terrestrial infrastructure equipment, a satellite type of each of the non-terrestrial infrastructure equipment, beam information associated with each of the non-terrestrial nfrastructure equipment, ephemeris information associated with each of the non-terrestrial infrastructure equipment, and a tracking area code, TAC, of each of the non-terrestrial infrastructure equipment.

Paragraph 8. A method according to any of Paragraphs 1 to 7, wherein the downlink signals transmitted by the communications device to the non-terrestrial infrastructure equipment are relayed by the non-terrestrial infrastructure equipment to a first ground infrastructure equipment forming part of the non-terrestrial network, and wherein the uplink signals received by the communications device from the non-terrestrial infrastructure equipment are relayed by the non-terrestrial infrastructure equipment from a second ground infrastructure equipment forming part of the non-terrestrial network.

Paragraph 9. A method according to any of Paragraphs 1 to 8, comprising detecting that the communications device is moving out of a coverage region of the terrestrial infrastructure equipment, transmitting an indication to the non-terrestrial infrastructure equipment that the communications device is moving out of the coverage region of the terrestrial infrastructure equipment, and switching to an NTN mode of operation in which the communications device is configured to transmit the uplink signals to and receive the downlink signals from the non-terrestrial infrastructure equipment.

Paragraph 10. A method according to Paragraph 9, comprising transmitting, to the terrestrial infrastructure equipment prior to switching to the NTN mode of operation, data stored at the communications device for transmission to one of the non-terrestrial infrastructure equipment and the terrestrial infrastructure equipment.

Paragraph 11. A communications device comprising transceiver circuitry configured to transmit uplink signals to and/or to receive downlink signals from a non-terrestrial infrastructure equipment forming part of a non-terrestrial network, NTN, and to transmit uplink signals to and/or to receive uplink signals from a terrestrial infrastructure equipment forming part of a terrestrial network, TN, and controller circuitry configured in combination with the transceiver circuitry to communicate with the non-terrestrial infrastructure equipment via one of a plurality of spot beams, each of the spot beams providing a first wireless access interface for transmitting the uplink signals to and/or receiving the downlink signals from the non-terrestrial infrastructure equipment within a coverage region formed by the each of the spot beams, and to communicate with the terrestrial infrastructure equipment via a second wireless access interface provided by the terrestrial infrastructure equipment, wherein the communications device is configured to operate in accordance with a dual connectivity mode of operation, the dual connectivity mode of operation comprising either transmitting the uplink signals to the terrestrial infrastructure and receiving the downlink signals from the non-terrestrial infrastructure equipment or transmitting the uplink signals to the non-terrestrial infrastructure equipment and receiving the downlink signals from the terrestrial infrastructure equipment.

Paragraph 12. Circuitry for a communications device comprising transceiver circuitry configured to transmit uplink signals to and/or to receive downlink signals from a non-terrestrial infrastructure equipment forming part of a non-terrestrial network, NTN, and to transmit uplink signals to and/or to receive uplink signals from a terrestrial infrastructure equipment forming part of a terrestrial network, TN, and controller circuitry configured in combination with the transceiver circuitry to communicate with the non-terrestrial infrastructure equipment via one of a plurality of spot beams, each of the spot beams providing a first wireless access interface for transmitting the uplink signals to and/or receiving the downlink signals from the non-terrestrial infrastructure equipment within a coverage region formed by the each of the spot beams, and to communicate with the terrestrial infrastructure equipment via a second wireless access interface provided by the terrestrial infrastructure equipment, wherein the circuitry is configured to operate in accordance with a dual connectivity mode of operation, the dual connectivity mode of operation comprising either transmitting the uplink signals to the terrestrial infrastructure and receiving the downlink signals from the non-terrestrial infrastructure equipment or transmitting the uplink signals to the non-terrestrial infrastructure equipment and receiving the downlink signals from the terrestrial infrastructure equipment.

Paragraph 13. A method of operating a non-terrestrial infrastructure equipment forming part of a non-terrestrial network, NTN, the non-terrestrial infrastructure equipment being configured to transmit downlink signals to and/or to receive uplink signals from a communications device, the method comprising providing a plurality of spot beams, each of the spot beams providing a wireless access interface for transmitting the downlink signals to and/or receiving the downlink signals from the communications device within a coverage region formed by the each of the spot beams, and determining that the communications device is operating in in accordance with a dual connectivity mode of operation, the dual connectivity mode of operation comprising the communications device either transmitting the uplink signals to a terrestrial infrastructure forming part of a terrestrial network, TN, and receiving the downlink signals from the non-terrestrial infrastructure equipment or transmitting the uplink signals to the non-terrestrial infrastructure equipment and receiving the downlink signals from the terrestrial infrastructure equipment.

Paragraph 14. A method according to Paragraph 13, comprising transmitting signalling information to the communications device, the signalling information indicating that the communications device is to switch operation from an NTN mode of operation in which the communications device is configured to transmit the uplink signals to and receive the downlink signals from the non-terrestrial infrastructure equipment to the dual connectivity mode of operation.

Paragraph 15. A method according to Paragraph 14, comprising detecting that either a time taken for one of the uplink signals to be transmitted or a time taken for one of the downlink signals to be received is longer than a threshold time, and transmitting the signalling information in response to detecting that either the time taken for one of the uplink signals to be transmitted or the time taken for one of the downlink signals to be received is longer than the threshold time.

Paragraph 16. A method according to any of Paragraphs 13 to 15, comprising transmitting a command to the communications device that the communications device is to provide the non-terrestrial infrastructure equipment with an indication of all terrestrial infrastructure equipment having a coverage region within which the communications device is located, and receiving, from the communications device, a report comprising an indication of each of the terrestrial infrastructure equipment and/or an indication of measurements performed on signals received by the communications device from each of the terrestrial infrastructure equipment.

Paragraph 17. A method according to any of Paragraphs 13 to 16, comprising relaying the uplink signals received by the non-terrestrial infrastructure equipment from the communications device to a first ground infrastructure equipment forming part of the non-terrestrial network, and relaying the downlink signals to the communications device from a second ground infrastructure equipment forming part of the non-terrestrial network.

Paragraph 18. A method according to any of Paragraphs 13 to 17, comprising receiving an indication from the communications device that the communications device is moving out of the coverage region of the terrestrial infrastructure equipment, and determining that the communications device will switch to an NTN mode of operation in which the communications device is configured to transmit the uplink signals to and receive the downlink signals from the non-terrestrial infrastructure equipment.

Paragraph 19. A method according to Paragraph 18, comprising preparing, in response to determining that the communications device will switch to the NTN mode of operation, a multi-access edge computing, MEC, function at the non-terrestrial infrastructure equipment, the MEC function controlling the caching of data received from and/or to be transmitted to the communications device.

Paragraph 20. A method according to Paragraph 19, wherein the MEC function is prepared as a new MEC function at the non-terrestrial infrastructure equipment in parallel to a MEC function at the terrestrial infrastructure equipment.

Paragraph 21. A method according to Paragraph 19 or Paragraph 20, wherein the MEC function is migrated as an existing MEC function from the terrestrial infrastructure equipment to the non-terrestrial infrastructure equipment.

Paragraph 22. A method according to any of Paragraphs 18 to 21, comprising determining, in response to determining that the communications device will switch to the NTN mode of operation, a most efficient path between the non-terrestrial infrastructure equipment and a multi-access edge computing, MEC, function at the terrestrial infrastructure equipment, the MEC function controlling the caching of data received from and/or to be transmitted to the communications device.

Paragraph 23. A method according to any of Paragraphs 13 to 22, comprising receiving a location report from the communications device, determining, based on the location report, that the communications device is moving out of the coverage region of the terrestrial infrastructure equipment, and transmitting a command to the communications device indicating that the communications device is to switch to an NTN mode of operation in which the communications device is configured to transmit the uplink signals to and receive the downlink signals from the non-terrestrial infrastructure equipment.

Paragraph 24. A non-terrestrial infrastructure equipment forming part of a non-terrestrial network, NTN, the non-terrestrial infrastructure equipment comprising transceiver circuitry configured to transmit downlink signals to and/or to receive uplink signals from a communications device, and controller circuitry configured in combination with the transceiver circuitry to provide a plurality of spot beams, each of the spot beams providing a wireless access interface for transmitting the downlink signals to and/or receiving the downlink signals from the communications device within a coverage region formed by the each of the spot beams, and to determine that the communications device is operating in in accordance with a dual connectivity mode of operation, the dual connectivity mode of operation comprising the communications device either transmitting the uplink signals to a terrestrial infrastructure forming part of a terrestrial network, TN, and receiving the downlink signals from the non-terrestrial infrastructure equipment or transmitting the uplink signals to the non-terrestrial infrastructure equipment and receiving the downlink signals from the terrestrial infrastructure equipment.

Paragraph 25. Circuitry for a non-terrestrial infrastructure equipment forming part of a non-terrestrial network, NTN, the circuitry comprising transceiver circuitry configured to transmit downlink signals to and/or to receive uplink signals from a communications device, and controller circuitry configured in combination with the transceiver circuitry to provide a plurality of spot beams, each of the spot beams providing a wireless access interface for transmitting the downlink signals to and/or receiving the downlink signals from the communications device within a coverage region formed by the each of the spot beams, and to determine that the communications device is operating in in accordance with a dual connectivity mode of operation, the dual connectivity mode of operation comprising the communications device either transmitting the uplink signals to a terrestrial infrastructure forming part of a terrestrial network, TN, and receiving the downlink signals from the circuitry or transmitting the uplink signals to the circuitry and receiving the downlink signals from the terrestrial infrastructure equipment.

Paragraph 26. A method of operating a communications device configured to transmit uplink signals to and/or to receive downlink signals from a non-terrestrial infrastructure equipment forming part of a non-terrestrial network, NTN, the method comprising communicating with the non-terrestrial infrastructure equipment via one of a plurality of spot beams, each of the spot beams providing a first wireless access interface for transmitting the uplink signals to and/or receiving the downlink signals from the non-terrestrial infrastructure equipment within a coverage region formed by the each of the spot beams, and caching data received from the non-terrestrial infrastructure equipment via the downlink signals at a data rate which is higher than a rate at which the data is consumed at the communications device, the data being cached using a multi-access edge computing, MEC, function at the communications device.

Paragraph 27. A method according to Paragraph 26, comprising transmitting, to the non-terrestrial infrastructure equipment, an indication of one or both of a storage capability of the communications device and a processing capability of the communications device, the one or both of the storage capability of the communications device and the processing capability of the communications device being used by the non-terrestrial infrastructure equipment to determine whether the data can be transmitted to the communications device via the downlink signals at the data rate for caching using the MEC function at the communications device.

Paragraph 28. A communications device comprising transceiver circuitry configured to transmit uplink signals to and/or to receive downlink signals from a non-terrestrial infrastructure equipment forming part of a non-terrestrial network, NTN, and controller circuitry configured in combination with the transceiver circuitry to communicate with the non-terrestrial infrastructure equipment via one of a plurality of spot beams, each of the spot beams providing a first wireless access interface for transmitting the uplink signals to and/or receiving the downlink signals from the non-terrestrial infrastructure equipment within a coverage region formed by the each of the spot beams, and to cache data received from the non-terrestrial infrastructure equipment via the downlink signals at a data rate which is higher than a rate at which the data is consumed at the communications device, the data being cached using a multi-access edge computing, MEC, function at the communications device.

Paragraph 29. Circuitry for a communications device comprising transceiver circuitry configured to transmit uplink signals to and/or to receive downlink signals from a non-terrestrial infrastructure equipment forming part of a non-terrestrial network, NTN, and controller circuitry configured in combination with the transceiver circuitry to communicate with the non-terrestrial infrastructure equipment via one of a plurality of spot beams, each of the spot beams providing a first wireless access interface for transmitting the uplink signals to and/or receiving the downlink signals from the non-terrestrial infrastructure equipment within a coverage region formed by the each of the spot beams, and to cache data received from the non-terrestrial infrastructure equipment via the downlink signals at a data rate which is higher than a rate at which the data is consumed at the communications device, the data being cached using a multi-access edge computing, MEC, function of the circuitry.

Paragraph 30. A method of operating a non-terrestrial infrastructure equipment forming part of a non-terrestrial network, NTN, the non-terrestrial infrastructure equipment being configured to transmit downlink signals to and/or to receive uplink signals from a communications device, the method comprising providing a plurality of spot beams, each of the spot beams providing a wireless access interface for transmitting the downlink signals to and/or receiving the downlink signals from the communications device within a coverage region formed by the each of the spot beams, determining whether data can be transmitted to the communications device via the downlink signals for caching using a multi-access edge computing, MEC, function at the communications device, and transmitting the data to the communications device at a data rate which is higher than a rate at which the data is to be consumed at the communications device.

Paragraph 31. A method according to Paragraph 30, comprising receiving, from the communications device, an indication of one or both of a storage capability of the communications device and a processing capability of the communications device, the one or both of the storage capability of the communications device and the processing capability of the communications device being used by the non-terrestrial infrastructure equipment in determining whether the data can be transmitted to the communications device via the downlink signals at the data rate for caching using the MEC function at the communications device.

Paragraph 32. A method according to Paragraph 31, comprising transmitting, to one of a core network and an application server configured to provide the data to the non-terrestrial infrastructure equipment, an indication of the data rate with which the non-terrestrial infrastructure equipment is to transmit the data to the communications device.

Paragraph 33. A non-terrestrial infrastructure equipment forming part of a non-terrestrial network, NTN, the non-terrestrial infrastructure equipment comprising transceiver circuitry configured to transmit downlink signals to and/or to receive uplink signals from a communications device, and controller circuitry configured in combination with the transceiver circuitry to provide a plurality of spot beams, each of the spot beams providing a wireless access interface for transmitting the downlink signals to and/or receiving the downlink signals from the communications device within a coverage region formed by the each of the spot beams, to determine whether data can be transmitted to the communications device via the downlink signals for caching using a multi-access edge computing, MEC, function at the communications device, and to transmit the data to the communications device at a data rate which is higher than a rate at which the data is to be consumed at the communications device.

Paragraph 34. Circuitry for a non-terrestrial infrastructure equipment forming part of a non-terrestrial network, NTN, the circuitry comprising transceiver circuitry configured to transmit downlink signals to and/or to receive uplink signals from a communications device, and controller circuitry configured in combination with the transceiver circuitry to provide a plurality of spot beams, each of the spot beams providing a wireless access interface for transmitting the downlink signals to and/or receiving the downlink signals from the communications device within a coverage region formed by the each of the spot beams, to determine whether data can be transmitted to the communications device via the downlink signals for caching using a multi-access edge computing, MEC, function at the communications device, and

to transmit the data to the communications device at a data rate which is higher than a rate at which the data is to be consumed at the communications device.

In so far as embodiments of the disclosure have been described as being implemented, at least in part, by soft- ware-controlled data processing apparatus, it will be appre- ciated that a non-transitory machine-readable medium car- rying such software, such as an optical disk, a magnetic disk, semiconductor memory or the like, is also considered to represent an embodiment of the present disclosure.

It will be appreciated that the above description for clarity has described embodiments with reference to different func- tional units, circuitry and/or processors. However, it will be apparent that any suitable distribution of functionality between different functional units, circuitry and/or proces- sors may be used without detracting from the embodiments.

Described embodiments may be implemented in any suitable form including hardware, software, firmware or any combination of these. Described embodiments may option- ally be implemented at least partly as computer software running on one or more data processors and/or digital signal processors. The elements and components of any embodi- ment may be physically, functionally and logically imple- mented in any suitable way. Indeed the functionality may be implemented in a single unit, in a plurality of units or as part of other functional units. As such, the disclosed embodi- ments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodi- ments may be combined in any manner suitable to imple- ment the technique.

REFERENCES

[1] TR 38.811, "Study on New Radio (NR) to support non terrestrial networks (Release 15)", 3rd Generation Part- nership Project, December 2017.
[2] Holma H. and Toskala A, "LTE for UMTS OFDMA and SC-FDMA based radio access", John Wiley and Sons, 2009.
[3] RP-172834, "Revised WID on New Radio Access Technology," NTT DOCOMO, RAN #78.
[4] TR 38.913, "Study on Scenarios and Requirements for Next Generation Access Technologies (Release 14)", 3rd Generation Partnership Project.
[5] "Multi-access Edge Computing (MEC)", European Telecommunications Standards Institute (ETSI), [On- line], Available at: https://www.etsi.org/technologies/ multi-access-edge-computing, accessed July 2020.
[6] TS 38.321, "NR: Medium Access Control (MAC) Protocol Specification (Release 15, v15.4.0)", 3GPP, January 2019.
[7] "Toward fully connected vehicles: Edge computing for advanced automotive communications", 5G Auto- motive Association (SGAA), [Online], Available at: https://5gaa.org/wp-content/uploads/2017/12/ 5GAA_T-170219-whitepaper- EdgeComputing_5GAA.pdf, accessed July 2020.

What is claimed is:

1. A method of operating a communications device con- figured to transmit uplink signals to and/or to receive downlink signals from a non-terrestrial infrastructure equip- ment forming part of a non-terrestrial network, NTN, and to transmit uplink signal to and/or to receive downlink signals from a terrestrial infrastructure equipment forming part of a terrestrial network, TN, the method comprising:

communicating with the non-terrestrial infrastructure equipment via one of a plurality of spot beams, each of the spot beams providing a first wireless access inter- face for transmitting the uplink signals to and/or receiv- ing the downlink signals from the non-terrestrial infra- structure equipment within a coverage region formed by the each of the spot beams;

communicating with the terrestrial infrastructure equip- ment via a second wireless access interface provided by the terrestrial infrastructure equipment, wherein the communications device is configured to operate in accordance with a dual connectivity mode of operation, the dual connectivity mode of operation comprising either transmitting the uplink signals to the terrestrial infrastructure equipment and receiving the downlink signals from the non-terrestrial infrastructure equip- ment or transmitting the uplink signals to the non- terrestrial infrastructure equipment and receiving the downlink signals from the terrestrial infrastructure equipment;

detecting that the communications device is moving out of a coverage region of the terrestrial infrastructure equipment:

transmitting an indication to the non-terrestrial infrastruc- ture equipment that the communications device is mov- ing out of the coverage region of the terrestrial infra- structure equipment; and switching, in response to the indication, to an NTN mode of operation in which the communications device is configured to transmit the uplink signals to and receive the downlink signals from the non-terrestrial infrastruc- ture equipment.

2. The method of claim 1, wherein the communications device is configured to transmit the uplink signals in a first frequency band and to receive the downlink signals in a second frequency band, wherein the first frequency band is different to the second frequency band.

3. The method of claim 1, comprising:

receiving signalling information from the NTN; and switching operation, based on the signalling information, from an NTN mode of operation in which the commu- nications device is configured to transmit the uplink signals to and receive the downlink signals from the non-terrestrial infrastructure equipment to the dual con- nectivity mode of operation.

4. The method of claim 3, wherein the communications device is configured to receive the signalling information when either a time taken for one of the uplink signals to be transmitted or a time taken for one of the downlink signals to be received is longer than a threshold time.

5. The method of claim 1, comprising:

receiving a command from the non-terrestrial infrastruc- ture equipment that the communications device is to provide the non-terrestrial infrastructure equipment with an indication of all terrestrial infrastructure equip- ment having a coverage region within which the com- munications device is located;

performing measurements on signals received from each of the terrestrial infrastructure equipment; and transmitting, to the non-terrestrial infrastructure equip- ment, a report comprising an indication of each of the terrestrial infrastructure equipment and/or an indication of the measurements performed on the signals received from each of the terrestrial infrastructure equipment.

6. The method of claim 1, comprising receiving a command from the terrestrial infrastructure equipment that the communications device is to provide the terrestrial infrastructure equipment with an indication of all non-terrestrial infrastructure equipment providing a spot beam which forms a coverage region within which the communications device is located;

performing measurements on signals received from each of the non-terrestrial infrastructure equipment; and transmitting, to the terrestrial infrastructure equipment, a report comprising an indication of each of the non-terrestrial infrastructure equipment and/or a report comprising an indication of the measurements performed on the signals received from each of the non-terrestrial infrastructure equipment.

7. The method of claim 6, wherein the report comprises one or more of: an indication of a public land mobile network, PLMN, of each of the non-terrestrial infrastructure equipment, a cell ID of each of the non-terrestrial infrastructure equipment, a satellite type of each of the non-terrestrial infrastructure equipment, beam information associated with each of the non-terrestrial infrastructure equipment, ephemeris information associated with each of the non-terrestrial infrastructure equipment, and a tracking area code, TAC, of each of the non-terrestrial infrastructure equipment.

8. The method of claim 1, wherein the uplink signals transmitted by the communications device to the non-terrestrial infrastructure equipment are relayed by the non-terrestrial infrastructure equipment to a first ground infrastructure equipment forming part of the non-terrestrial network, and wherein the downlink signals received by the communications device from the non-terrestrial infrastructure equipment are relayed by the non-terrestrial infrastructure equipment from a second ground infrastructure equipment forming part of the non-terrestrial network.

9. The method of claim 1, comprising:

transmitting, to the terrestrial infrastructure equipment prior to switching to the NTN mode of operation, data stored at the communications device for transmission to one of the non-terrestrial infrastructure equipment and the terrestrial infrastructure equipment.

10. The method according to claim 1, wherein detecting that the communications device is moving out of the coverage region of the terrestrial infrastructure equipment is based on one of a signal strength measurement of signals received from the terrestrial infrastructure equipment falling below a threshold or a location of the communications device determined via a global navigation satellite system, GNSS.

11. The method according to claim 1, wherein the indication transmitted to the non-terrestrial infrastructure equipment is used by the non-terrestrial infrastructure equipment to prepare a multi-access edge computing, MEC, function for the communications device.

12. The method according to claim 11, wherein the MEC function is prepared by migrating an existing MEC function from the terrestrial infrastructure equipment to the non-terrestrial infrastructure equipment.

13. A method of operating a non-terrestrial infrastructure equipment forming part of a non-terrestrial network, NTN, the non-terrestrial infrastructure equipment being configured to transmit downlink signals to and/or to receive uplink signals from a communications device, the method comprising:

providing a plurality of spot beams, each of the spot beams providing a wireless access interface for transmitting the downlink signals to and/or receiving the downlink signals from the communications device within a coverage region formed by the each of the spot beams; and determining that the communications device is operating in in accordance with a dual connectivity mode of operation, the dual connectivity mode of operation comprising the communications device either transmitting the uplink signals to a terrestrial infrastructure forming part of a terrestrial network, TN, and receiving the downlink signals from the non-terrestrial infrastructure equipment or transmitting the uplink signals to the non-terrestrial infrastructure equipment and receiving the downlink signals from the terrestrial infrastructure equipment.

14. The method of claim 13, comprising transmitting signalling information to the communications device, the signalling information indicating that the communications device is to switch operation from an NTN mode of operation in which the communications device is configured to transmit the uplink signals to and receive the downlink signals from the non-terrestrial infrastructure equipment to the dual connectivity mode of operation.

15. The method of claim 14, comprising:

detecting that either a time taken for one of the uplink signals to be transmitted or a time taken for one of the downlink signals to be received is longer than a threshold time; and transmitting the signalling information in response to detecting that either the time taken for one of the uplink signals to be transmitted or the time taken for one of the downlink signals to be received is longer than the threshold time.

16. The method of claim 13, comprising:

transmitting a command to the communications device that the communications device is to provide the non-terrestrial infrastructure equipment with an indication of all terrestrial infrastructure equipment having a coverage region within which the communications device is located; and receiving, from the communications device, a report comprising an indication of each of the terrestrial infrastructure equipment and/or an indication of measurements performed on signals received by the communications device from each of the terrestrial infrastructure equipment.

17. The method of claim 13, comprising:

relaying the uplink signals received by the non-terrestrial infrastructure equipment from the communications device to a first ground infrastructure equipment forming part of the non-terrestrial network; and relaying the downlink signals to the communications device from a second ground infrastructure equipment forming part of the non-terrestrial network.

18. The method of claim 13, comprising:

receiving an indication from the communications device that the communications device is moving out of the coverage region of the terrestrial infrastructure equipment; and determining that the communications device will switch to an NTN mode of operation in which the communications device is configured to transmit the uplink signals to and receive the downlink signals from the non-terrestrial infrastructure equipment.

19. The method of claim 18, comprising:

preparing, in response to determining that the communications device will switch to the NTN mode of operation, a multi-access edge computing, MEC, function at the non-terrestrial infrastructure equipment, the MEC function controlling the caching of data received from and/or to be transmitted to the communications device.

20. The method of claim 19, wherein the MEC function is prepared as a new MEC function at the non-terrestrial infrastructure equipment in parallel to a MEC function at the terrestrial infrastructure equipment.

21. The method of claim 19, wherein the MEC function is migrated as an existing MEC function from the terrestrial infrastructure equipment to the non-terrestrial infrastructure equipment.

22. A communications device comprising:

transceiver circuitry configured to transmit uplink signals to and/or to receive downlink signals from a non-terrestrial infrastructure equipment forming part of a non-terrestrial network, NTN, and to transmit uplink signals to and/or to receive uplink signals from a terrestrial infrastructure equipment forming part of a terrestrial network, TN; and controller circuitry configured in combination with the transceiver circuitry to communicate with the non-terrestrial infrastructure equipment via one of a plurality of spot beams, each of the spot beams providing a first wireless access interface for transmitting the uplink signals to and/or receiving the downlink signals from the non-terrestrial infrastructure equipment within a coverage region formed by the each of the spot beams;

communicate with the terrestrial infrastructure equipment via a second wireless access interface provided by the terrestrial infrastructure equipment, wherein the communications device is configured to operate in accordance with a dual connectivity mode of operation, the dual connectivity mode of operation comprising either transmitting the uplink signals to the terrestrial infrastructure and receiving the downlink signals from the non-terrestrial infrastructure equipment or transmitting the uplink signals to the non-terrestrial infrastructure equipment and receiving the downlink signals from the terrestrial infrastructure equipment;

detect that the communications device is moving out of a coverage region of the terrestrial infrastructure equipment;

transmit an indication to the non-terrestrial infrastructure equipment that the communications device is moving out of the coverage region of the terrestrial infrastructure equipment; and switch, in response to the indication, to an NTN mode of operation in which the communications device is configured to transmit the uplink signals to and receive the downlink signals from the non-terrestrial infrastructure equipment.

\*    \*    \*    \*    \*